United States Patent
Chang et al.

(10) Patent No.: US 11,931,730 B1
(45) Date of Patent: Mar. 19, 2024

(54) PALLADIUM PRECATALYST FOR CROSS-COUPLING REACTION AND SYNTHESIS METHOD THEREOF

(71) Applicant: PROVIDENCE UNIVERSITY, Taichung (TW)

(72) Inventors: Yu-Chang Chang, Taichung (TW); Siou-Wei Liang, Taichung (TW)

(73) Assignee: PROVIDENCE UNIVERSITY, Taichung (TW)

( * ) Notice: Subject to any disclaimer, the term of this patent is extended or adjusted under 35 U.S.C. 154(b) by 0 days.

(21) Appl. No.: 18/080,861

(22) Filed: Dec. 14, 2022

(30) Foreign Application Priority Data

Sep. 30, 2022 (TW) .................................. 111137359

(51) Int. Cl.
| | |
|---|---|
| *B01J 31/22* | (2006.01) |
| *B01J 31/18* | (2006.01) |
| *B01J 37/04* | (2006.01) |

(52) U.S. Cl.
CPC ....... *B01J 31/2273* (2013.01); *B01J 31/1875* (2013.01); *B01J 37/04* (2013.01); *B01J 2231/4227* (2013.01); *B01J 2231/4233* (2013.01); *B01J 2231/4277* (2013.01); *B01J 2231/4283* (2013.01); *B01J 2531/824* (2013.01)

(58) Field of Classification Search
None
See application file for complete search history.

(56) References Cited

PUBLICATIONS

Liang et al. "Reactivity-Tunable Palladium Precatalysts with Favorable Catalytic Properties in Suzuki-Miyaura Cross-Coupling Reactions" ChemCatChem, 2022, vol. 14, No. 16, Article e202200736, 8 pages.*

* cited by examiner

*Primary Examiner* — Joseph R Kosack
(74) *Attorney, Agent, or Firm* — WPAT, P.C (57) ABSTRACT

The present invention provides a palladium precatalyst for cross-coupling reaction, the palladium precatalyst comprising a structure represented by following formula 1:

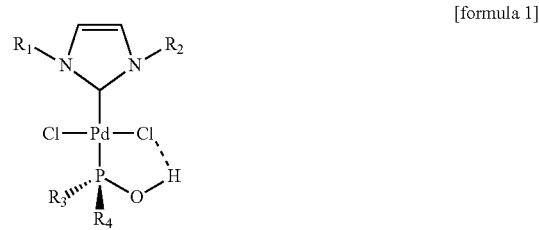

[formula 1]

wherein, $R_1$ and $R_2$ are the same, and $R_1$ and $R_2$ are substituted or unsubstituted phenyl; $R_3$ and $R_4$ are the same, and $R_3$ and $R_4$ are substituted or unsubstituted phenyl or cyclohexyl.

10 Claims, 3 Drawing Sheets

PALLADIUM PRECATALYST FOR CROSS-COUPLING REACTION AND SYNTHESIS METHOD THEREOF

BACKGROUND OF THE INVENTION

1. Field of the Invention

The present invention relates to palladium precatalyst, and more particularly, to a palladium precatalyst for cross-coupling reaction and synthesis method thereof.

2. Description of the Related Art

Since the late 1960s, the transition metal-catalyzed cross-coupling reaction has become a widely used organic synthesis technique in both academic and industrial fields. Among different transition metals, due to the outstanding catalytic ability, palladium metal (Pd) is widely used in various cross-coupling reactions.

Therein, Pd-PEPPSI-IPr is a palladium precatalyst which is stable and also widely used in cross-coupling reactions. This palladium precatalyst is stable in environment, convenient to operate, and highly effective in various cross-coupling reactions. However, precatalysts with the abovementioned features are relatively limited. Therefore, it is desirable to develop highly effective and potentially universal precatalysts in the industrial applications.

SUMMARY OF THE INVENTION

To achieve the abovementioned goal, the present invention discloses a new type of palladium precatalyst for cross-coupling reaction. Compared with other known palladium precatalysts for cross-coupling reactions, the palladium precatalysts disclosed by the present invention have high catalytic efficiency, simple preparation with high yields, and are able to provide good catalytic capability to several kinds of cross-coupling reactions.

The present invention provides a new type of stable and highly effective palladium precatalyst comprising a molecular structure shown in formula 1:

[formula 1]

wherein, $R_1$ and $R_2$ are the same, and $R_1$ and $R_2$ are substituted or unsubstituted phenyl; $R_3$ and $R_4$ are the same, and $R_3$ and $R_4$ are substituted or unsubstituted phenyl or cyclohexyl.

Also, the present invention provides the synthesis methods of a new series of palladium precatalysts for cross-coupling reaction, comprising following steps:

Step S1: providing a first reactant comprising a structure represented by following formula 2:

[formula 2]

wherein, $Y_1$ and $Y_2$ are the same, and $Y_1$ and $Y_2$ comprise a structure represented by following formula 3:

[formula 3]

wherein, $R_1$ and $R_2$ are the same, and $R_1$ and $R_2$ are substituted or unsubstituted phenyl; the wavy line indicates a bonding site with Pd.

Step S2, providing a second reactant comprising a structure represented by following formula 4:

[formula 4]

wherein, $R_3$ and $R_4$ are the same, and $R_3$ and $R_4$ are substituted or unsubstituted phenyl or cyclohexyl.

Step S3: reacting the first reactant and the second reactant in a reaction environment to obtain a palladium precatalyst for cross-coupling reaction, wherein the reaction environment includes a solvent, which is selected from acetone and toluene.

With forgoing disclosure, the palladium precatalyst provided by the present invention achieves the advantages of high catalytic efficiency, simple synthesis steps, and high synthesis yield in cross-coupling reactions (e.g. Suzuki reaction, Buchwald-Hartwig amination, Kumada reaction, and Hirao reaction) compared to other palladium precatalysts that are conventionally used in cross-coupling reactions.

DETAILED DESCRIPTION OF THE INVENTION

The aforementioned and further advantages and features of the present invention will be understood by reference to the description of the preferred embodiment in conjunction with the accompanying drawings where the components are illustrated based on a proportion for explanation but not subject to the actual component proportion.

An embodiment of the present invention provides a new type of palladium precatalyst for cross-coupling reactions, the palladium precatalyst comprising a structure represented by following formula 1:

[formula 1]

wherein, $R_1$ and $R_2$ are the same, and $R_1$ and $R_2$ are substituted or unsubstituted phenyl; $R_3$ and $R_4$ are the same, and $R_3$ and $R_4$ are substituted or unsubstituted phenyl or cyclohexyl; the cross-coupling reactions includes Suzuki reaction, Buchwald-Hartwig amination, Kumada reaction, and Hirao reaction.

In an embodiment of the present invention, $R_1$ and $R_2$ are selected from one of 2,6-diisopropylphenyl and mesityl; $R_3$ and $R_4$ are selected from one of tolyl, phenyl, and cyclohexyl. Further, the palladium precatalyst is selected from one of the following formulas 1A to 1D (namely palladium precatalyst 1A, palladium precatalyst 1B, palladium precatalyst 1C, and palladium precatalyst 1D):

[formula 1A]

[formula 1B]

In an embodiment of the present invention, in the palladium precatalysts 1A to 1D, Pd and P are connected to each other through a first coordination bond in which the electron pairs are independently provided by P; also, Pd and N-heterocyclic carbene (NHC) are connected through a second coordination bond in which the electron pairs are independently provided by C of NHC. Therein, after the P—OH of the first coordination bond is deprotonated, the bonding ability of the first coordination bond is greater than the bonding ability of the second coordination bond. Therefore, when the palladium precatalysts 1A to 1D are used in the cross-coupling reaction, the coordination bond between Pd and NHC will be broken, whereby the present invention obtains an intermediate substance by a dissociation process, and the intermediate substance is converted into a catalyst in the cross-coupling reaction, thereby improving the catalytic efficiency of the cross-coupling reaction. The intermediate substance includes a structure represented by following formulas A to C (hereinafter referred to as the intermediate substance A, intermediate substance B, and intermediate substance C):

[formula A]

[formula B]

[formula C]

Accordingly, the intermediate substance A is generated by the palladium precatalyst 1A or palladium precatalyst 1B, wherein the molecular weight of the intermediate substance A is approximately 406.56. The intermediate substance B is generated by the palladium precatalyst 1C, wherein the molecular weight of the intermediate substance B is approximately 378.51. The intermediate substance C is generated by the palladium precatalyst 1D, wherein the molecular weight of the intermediate substance C is approximately 390.6.

Figure 1A:
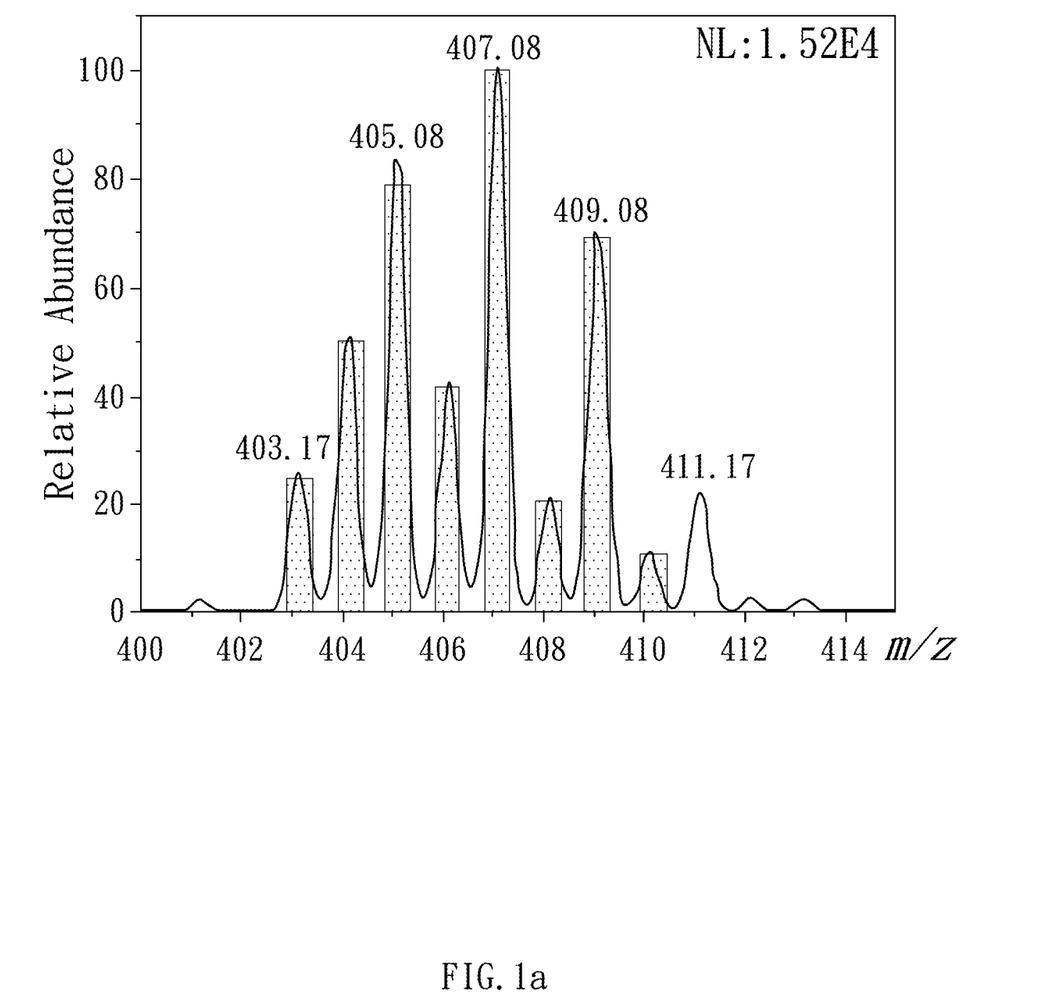
FIG. 1a to FIG. 1c are the electrospray mass spectrograms of the present invention for detection of intermediate substances.
Figure 1B:
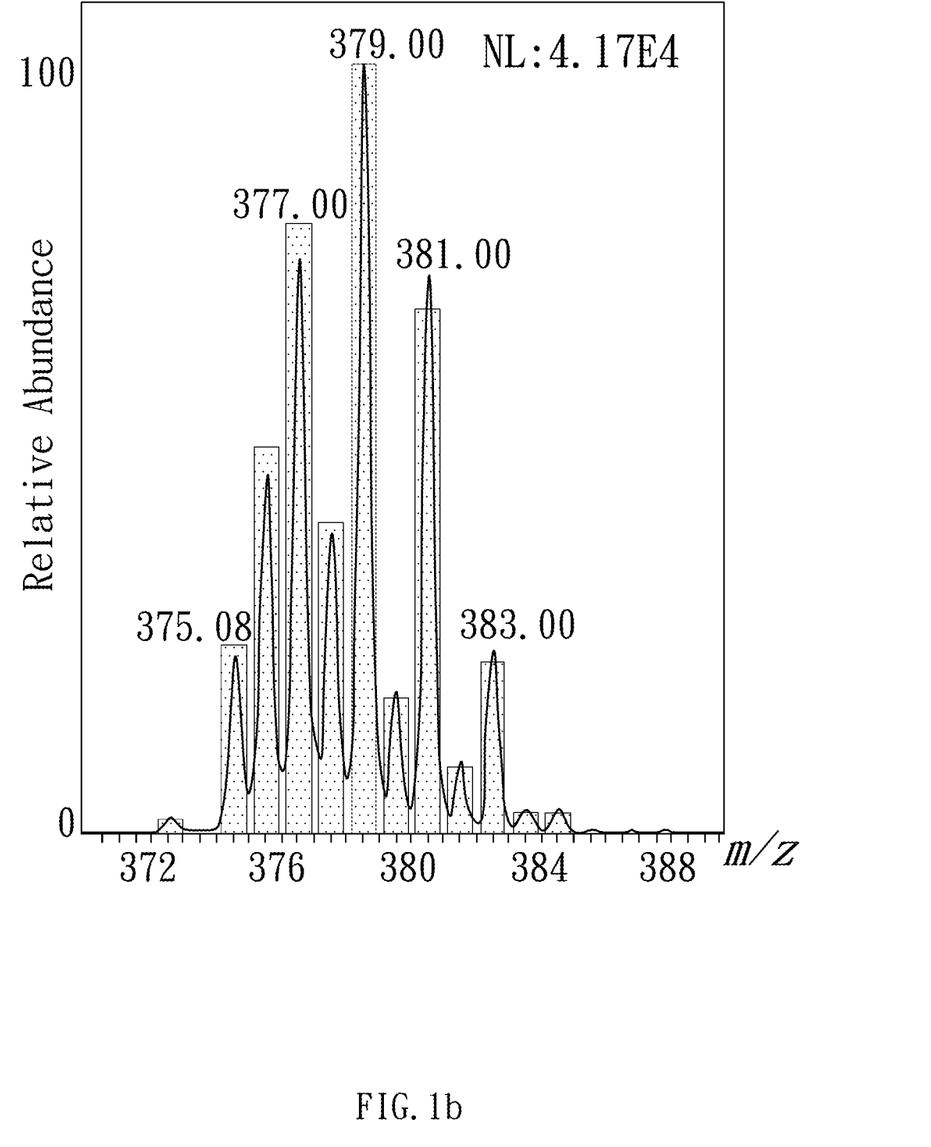
Figure 1C:
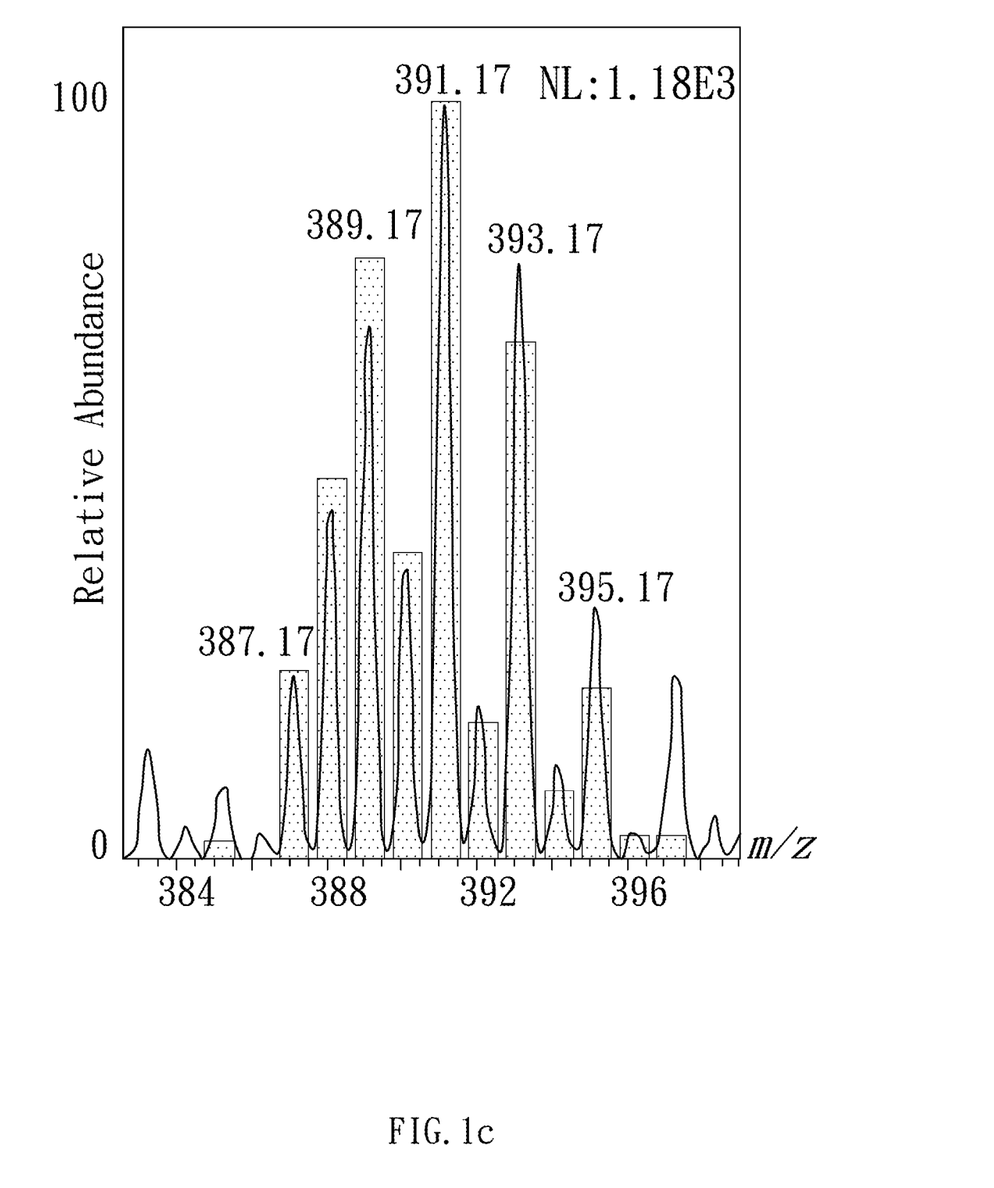

FIG. 1a to FIG. 1c sequentially display the isotope distribution of the intermediate substance A, intermediate substance B, and intermediate substance C (through detection by negative-ion electrospray mass spectrometry). Therein, the isotope distribution of the intermediate substance (intermediate substance A, intermediate substance B, and intermediate substance C) is highly matched with the theoretical isotope distribution (the theoretical prediction signal is represented by a bar chart). Therefore, it is clear that, after the deprotonation of the precatalyst 1A, precatalyst 1B, precatalyst 1C, and precatalyst 1D, the coordination bond between Pd and NHC is broken, whereby the present invention obtains the intermediate substance A, intermediate substance B and intermediate substance C, respectively, by a NHC dissociation process, and the intermediate substance is converted into a catalyst in the cross-coupling reaction, thereby improving the catalytic efficiency of the cross-coupling reaction.

The following content provides the comparison of the catalytic effect of the present invention (taking the palladium precatalyst 1A and 1B as examples) and other conventional palladium precatalysts in the Suzuki reaction. Table 1 and Table 2 list out the comparison applied in the Suzuki reaction 1 and Suzuki reaction 2, respectively. The reaction conditions for both Suzuki reaction 1 and Suzuki reaction 2 include 1.5 equivalents of KOtBu, 2 ml of ethanol (EtOH), and a temperature of 35 degrees Celsius.

As shown by the following Table 1 (taking Suzuki reaction 1 as example), the catalytic effects of the palladium precatalyst 1A and 1B and other conventional palladium precatalysts are disclosed. Therein, it is shown that the palladium precatalyst 1A (achieving a yield of 99% in 3 minutes) and 1B (achieving a yield of 96% in 10 minutes) achieve greater catalytic efficiency compared to other conventional palladium precatalysts (such as Pd-PEPPSI-IPr, which achieves a yield of only 87% in 10 minutes).

TABLE 1

[Suzuki reaction 1]

$$\text{Ph–Cl} + 1.06\ \text{C}_6\text{H}_4\text{–B(OH)}_2 \xrightarrow[\text{2 ml EtOH}\ 35°\text{C.}]{1.5\ \text{KO}^t\text{Bu}} \text{biphenyl}$$

| Precatalyst | Precatalyst concentration (mol %) | Reaction time (minutes) | Yield (%) |
|---|---|---|---|
| palladium precatalyst 1A | 1 | 3 | 99 |
| palladium precatalyst 1B | 1 | 10 | 96 |
| Pd-PEPPSI-IPr | 1 | 10 | 87 |
| [(IPr)PdCl$_2$]$_2$ | 0.5 | 10 | 24 |

Next, as shown by the following Table 2 (taking Suzuki reaction 1 as example), the catalytic effects of the palladium precatalyst 1A and 1B and other conventional palladium precatalysts are disclosed. Therein, it is shown that the palladium precatalyst 1A (achieving a yield of 99% in 5 minutes) and 1B (achieving a yield of 93% in 10 minutes) achieve greater catalytic efficiency compared to other conventional palladium precatalysts (such as Pd-PEPPSI-IPr, which achieves a yield of only 30% in 10 minutes). Therefore, as shown by Table 1 and Table 2, in the Suzuki reaction, both the palladium precatalyst 1A and 1B achieve greater catalytic efficiency compared to other conventional palladium precatalysts.

TABLE 2

[Suzuki reaction 2]

$$\text{MeO–C}_6\text{H}_4\text{–Cl} + 1.06\ \text{C}_6\text{H}_4\text{–B(OH)}_2 \xrightarrow[\text{2 ml EtOH}\ 35°\text{C.}]{1.5\ \text{KO}^t\text{Bu}} \text{MeO–biphenyl}$$

| Precatalyst | Precatalyst concentration (mol %) | Reaction time (minutes) | Yield (%) |
|---|---|---|---|
| palladium precatalyst 1A | 1 | 5 | 99 |
| palladium precatalyst 1B | 1 | 10 | 93 |
| Pd-PEPPSI-IPr | 1 | 10 | 30 |
| [(IPr)PdCl$_2$]$_2$ | 0.5 | 10 | 22 |

The following content provides the comparison of the catalytic effect of the present invention (taking the palladium precatalyst 1A, 1C, and 1D as examples) and other conventional palladium precatalysts in the Buchwald-Hartwig amination. Table 3 and Table 4 list out the comparison applied in the Buchwald-Hartwig amination 1 and Buchwald-Hartwig amination 2, respectively. The reaction conditions for both Buchwald-Hartwig amination 1 and Buchwald-Hartwig amination 2 include 1.1 equivalents of KOtBu and a temperature of 80 degrees Celsius, under solvent-free conditions.

As shown by the following Table 3 (taking Buchwald-Hartwig amination 1 as example), the catalytic effects of the palladium precatalyst 1A, 1C, and 1D and other conventional palladium precatalysts are disclosed. Therein, it is shown that the palladium precatalyst 1A (achieving a yield of 99% in 3 hours), 1C (achieving a yield of 98% in 3 hours), and 1D (achieving a yield of 99% in 3 hours) achieve greater catalytic efficiency compared to other conventional palladium precatalysts.

TABLE 3

[Buchwald-Hartwig amination 1]

| Precatalyst | Precatalyst concentration (mol %) | Reaction time (hours) | Yield (%) |
|---|---|---|---|
| palladium precatalyst 1A | 1 | 3 | 99 |
| palladium precatalyst 1C | 1 | 3 | 98 |
| palladium precatalyst 1D | 1 | 3 | 99 |
| Pd-PEPPSI-IPr | 1 | 3 | 80 |
| [(IPr)PdCl$_2$]$_2$ | 0.5 | 3 | 76 |

Next, as shown by the following Table 4 (taking Buchwald-Hartwig amination 2 as example), the catalytic effects of the palladium precatalyst 1A, 1C, and 1D and other conventional palladium precatalysts are disclosed. Therein, it is shown that the palladium precatalyst 1A (achieving a yield of 99% in 6 hours), 1C (achieving a yield of 99% in 6 hours), and 1D (achieving a yield of 99% in 6 hours) achieve greater catalytic efficiency compared to other conventional palladium precatalysts. Therefore, as shown by Table 3 and Table 4, in the Buchwald-Hartwig amination, the palladium precatalyst 1A, 1C, and 1D achieve greater catalytic efficiency compared to other conventional palladium precatalysts.

TABLE 4

[Buchwald-Hartwig amination 2]

| Precatalyst | Precatalyst concentration (mol %) | Reaction time (hours) | Yield (%) |
|---|---|---|---|
| palladium precatalyst 1A | 1 | 6 | 99 |
| palladium precatalyst 1C | 1 | 6 | 99 |
| palladium precatalyst 1D | 1 | 6 | 99 |
| Pd-PEPPSI-IPr | 1 | 6 | 68 |
| [(IPr)PdCl$_2$]$_2$ | 0.5 | 6 | 69 |

The following content provides the comparison of the catalytic effect of the present invention (taking the palladium precatalyst 1A as example) and other conventional palladium precatalysts in the Hirao reaction. As shown by the following Table 5, the reaction conditions for the Hirao reaction include 2 equivalents of $Cs_2CO_3$, 2 ml of ethanol (EtOH), and a temperature of 90 degrees Celsius.

Referring to the following Table 5, in the Hirao reaction, it is shown that the palladium precatalyst 1A (achieving an NMR yield of 99% in 40 minutes) achieves a greater catalytic efficiency compared to other conventional palladium precatalysts.

TABLE 5

[Hirao reaction]

| Precatalyst | Precatalyst concentration (mol %) | Reaction time (minutes) | Yield (%) |
|---|---|---|---|
| palladium precatalyst 1A | 5 | 40 | 99 |
| Pd-PEPPSI-IPr | 5 | 40 | 98 |
| [(IPr)PdCl$_2$]$_2$ | 2.5 | 40 | 92 |

The following content provides the comparison of the catalytic effect of the present invention (taking the palladium precatalyst 1A as example) and other conventional palladium precatalysts in the Kumada reaction. As shown by the following Table 6, the reaction conditions for the Kumada reaction include 2.5 ml of tetrahydrofuran (THF) and a temperature of 50 degrees Celsius.

Referring to the following Table 6, in the Kumada reaction, it is shown that the palladium precatalyst 1A (achieving a yield of 83% in 5 hours) achieves a greater catalytic efficiency compared to other conventional palladium precatalysts.

TABLE 6

[Kumada reaction]

| Precatalyst | Precatalyst concentration (mol %) | Reaction time (hours) | Yield (%) |
|---|---|---|---|
| palladium precatalyst 1A | 1 | 5 | 83 |
| Pd-PEPPSI-IPr | 1 | 5 | 78 |
| [(IPr)PdCl$_2$]$_2$ | 0.5 | 5 | 26 |

The following content provides the comparison of the catalytic effect of different concentrations of the present invention (taking the palladium precatalyst 1A as example) and other conventional palladium precatalysts in the Suzuki reaction (taking the Suzuki reaction 1 as example). Referring to the following Table 7, the reaction conditions for the Suzuki reaction 1 include 1.5 equivalents of KO$^t$Bu, 2 ml of ethanol (EtOH), and a temperature of 35 degrees Celsius.

As shown by Table 7, the catalytic effects of different concentrations of the palladium precatalyst 1A in the Suzuki reaction 1 are disclosed. Therein, it is clear that, even if the concentration of the palladium precatalyst 1A is diluted to 3% (diluted from 1 to 0.03) of the original concentration, the turnover frequency (TOF) of the palladium precatalyst 1A is still higher than the use standard (the minimum use standard of the turnover frequency is 1500). Therefore, it is clear that the palladium precatalyst 1 A is still able to maintain a good catalytic efficiency in low concentrations.

TABLE 7

[Suzuki reaction 1]

| Precatalyst concentration (mol %) | Reaction time (minutes) | Yield (%) | TON(times) | TOF(times/H) |
|---|---|---|---|---|
| 1 | 3 | 99 | 99 | 1980 |
| 0.1 | 35 | 99 | 990 | 1697 |
| 0.03 | 60 | 91 | 3033 | 3033 |

Furthermore, the present invention provides a synthesis method of the palladium precatalyst, comprising following steps:

Step S1: providing a first reactant comprising a structure represented by following formula 2:

[formula 2]

wherein, $Y_1$ and $Y_2$ are the same, and $Y_1$ and $Y_2$ comprise a structure represented by following formula 3:

[formula 3]

wherein, $R_1$ and $R_2$ are the same, and $R_1$ and $R_2$ are substituted or unsubstituted phenyl; the wavy line indicates a bonding site with Pd (formula A to C). Further, in the embodiment, $R_1$ and $R_2$ are selected from one of 2,6-diisopropylphenyl and mesityl.

Step S2: providing a second reactant comprising a structure represented by following formula 4:

[formula 4]

wherein, $R_3$ and $R_4$ are the same, and $R_3$ and $R_4$ are substituted or unsubstituted phenyl or cyclohexyl. Further, in the embodiment, $R_3$ and $R_4$ are selected from one of tolyl, phenyl, and cyclohexyl.

Step S3: reacting the first reactant and the second reactant in a reaction environment to obtain a palladium precatalyst for cross-coupling reaction, wherein the reaction environment includes a solvent, which is selected from acetone and toluene. Further the synthesis method of the palladium precatalyst is represented by following chemical equation:

[chemical equation]

Accordingly, when $R_1$ and $R_2$ of the first reactant are 2,6-diisopropylphenyl, $R_3$ and $R_4$ of the second reactant are tolyl, the temperature of the reaction environment is 30 degrees Celsius, and the solvent is acetone, the palladium precatalyst represented by the aforementioned formula 1A is obtained, wherein, the synthesis reaction time of the palladium precatalyst is 3 hours, and the yield of the palladium precatalyst ranges from 80% to 90%. When $R_1$ and $R_2$ of the first reactant are mesityl, $R_3$ and $R_4$ of the second reactant are tolyl, the temperature of the reaction environment is 30 degrees Celsius, and the solvent is acetone, the palladium precatalyst represented by the aforementioned formula 1B is obtained, wherein, the synthesis reaction time of the palladium precatalyst is 3 hours, and the yield of the palladium precatalyst ranges from 75% to 85%. When $R_1$ and $R_2$ of the first reactant are 2,6-diisopropylphenyl, $R_3$ and $R_4$ of the second reactant are phenyl, the temperature of the reaction environment is 70 degrees Celsius, and the solvent is toluene, the palladium precatalyst represented by the aforementioned formula 1C is obtained, wherein, the synthesis reaction time of the palladium precatalyst is 12 hours, and the yield of the palladium precatalyst ranges from 60% to 70%. When $R_1$ and $R_2$ of the first reactant are 2,6-diisopropylphenyl, $R_3$ and $R_4$ of the second reactant are cyclohexyl, the temperature of the reaction environment is 70 degrees Celsius, and the solvent is toluene, the palladium precatalyst represented by the aforementioned formula 1D is obtained, wherein, the synthesis reaction time of the palladium precatalyst is 4 hours, and the yield of the palladium precatalyst ranges from 70% to 80%.

With forgoing disclosure, the palladium precatalyst provided by the present invention achieves the advantages of high catalytic efficiency, simple synthesis steps, and high synthesis yield in cross-coupling reactions (e.g. Suzuki reaction, Buchwald-Hartwig amination, Kumada reaction, and Hirao reaction) compared to other palladium precatalysts that are conventionally used in cross-coupling reactions.

Also, the palladium precatalyst provided by the present invention is still able to maintain good catalytic efficiency in low concentrations, so that the usable times of each unit concentration of the palladium precatalyst is increased, thereby reducing the cost of precatalyst usage.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A palladium precatalyst for cross-coupling reaction, the palladium precatalyst comprising a structure represented by following formula 1:

[formula 1]

wherein, $R_1$ and $R_2$ are the same, and $R_1$ and $R_2$ are substituted or unsubstituted phenyl; $R_3$ and $R_4$ are the same, and $R_3$ and $R_4$ are substituted or unsubstituted phenyl or cyclohexyl.

2. The palladium precatalyst of claim 1, wherein $R_1$ and $R_2$ are 2,6-diisopropylphenyl; $R_3$ and $R_4$ are tolyl.

3. The palladium precatalyst of claim 1, wherein $R_1$ and $R_2$ are mesityl; $R_3$ and $R_4$ are tolyl.

4. The palladium precatalyst of claim 1, wherein $R_1$ and $R_2$ are 2,6-diisopropylphenyl; $R_3$ and $R_4$ are phenyl.

5. The palladium precatalyst of claim 1, wherein $R_1$ and $R_2$ are 2,6-diisopropylphenyl; $R_3$ and $R_4$ are cyclohexyl.

6. A synthesis method of the palladium precatalyst for cross-coupling reaction of claim 1, comprising following steps:

step S1: providing a first reactant comprising a structure represented by following formula 2:

[formula 2]

wherein, $Y_1$ and $Y_2$ are the same, and $Y_1$ and $Y_2$ comprise a structure represented by following formula 3:

[formula 3]

wherein, $R_1$ and $R_2$ are the same, and $R_1$ and $R_2$ are substituted or unsubstituted phenyl; the wavy line indicates a bonding site with Pd;

step S2, providing a second reactant comprising a structure represented by following formula 4:

[formula 4]

wherein, $R_3$ and $R_4$ are the same, and $R_3$ and $R_4$ are substituted or unsubstituted phenyl or cyclohexyl; and step S3: reacting the first reactant and the second reactant in a reaction environment to obtain the palladium precatalyst for cross-coupling reaction, wherein the reaction environment includes a solvent, which is acetone or toluene.

7. The synthesis method of claim 6, wherein $R_1$ and $R_2$ are 2,6-diisopropylphenyl; $R_3$ and $R_4$ are tolyl; a temperature of the reaction environment is 30 degrees Celsius; the solvent is acetone.

8. The synthesis method of claim 6, wherein $R_1$ and $R_2$ are mesityl; $R_3$ and $R_4$ are tolyl; a temperature of the reaction environment is 30 degrees Celsius; the solvent is acetone.

9. The synthesis method of claim 6, wherein $R_1$ and $R_2$ are 2,6-diisopropylphenyl; $R_3$ and $R_4$ are phenyl; a temperature of the reaction environment is 70 degrees Celsius; the solvent is toluene.

10. The synthesis method of claim 6, wherein $R_1$ and $R_2$ are 2,6-diisopropylphenyl; $R_3$ and $R_4$ are cyclohexyl; a temperature of the reaction environment is 70 degrees Celsius; the solvent is toluene.

* * * * *